Patented Apr. 1, 1952

2,591,020

UNITED STATES PATENT OFFICE 2,591,020

ALLYLATED TRIMETHYLENE TRISULFONES

Allen E. Smith, Oxford, Conn., assignor, by mesne assignments, to the United States of America as represented by the Secretary of the Navy No Drawing. Application August 3, 1950, Serial No. 177,562

10 Claims. (Cl. 260—45.4)

This invention relates to new compositions of matter, namely, allylated 1,3,5-trimethylene trisulfones having at least 5 allyl groups per molecule, homopolymers and copolymers thereof, and to the process of making said allylated 1,3,5-trimethylene trisulfones.

The present invention is based upon my discovery of pentaallyl-1,3,5-trimethylene trisulfone, hexaallyl 1,3,5-trimethylene trisulfone and mixtures thereof as new chemical materials. My invention is also based upon my discovery that these new compounds can be polymerized or copolymerized with other monomers to give polymers having extremely advantageous properties.

I have further discovered that the penta- and hexa- allylated 1,3,5-trimethylene trisulfones can be prepared in a simple and advantageous manner by reacting an allyl halide, namely, allyl chloride or bromide, with 1,3,5-trimethylene trisulfone in aqueous alkaline solutions, the molar ratio of allyl halide to 1,3,5-trimethylene trisulfone being at least 5:1. The reaction mixture is agitated until the reaction is substantially complete whereupon the resulting reaction mixture is treated in any suitable way to recover therefrom the penta- or hexaallyl-1,3,5-trimethylene trisulfone or mixtures of the penta- and the hexa- compounds.

I prefer to make the new monomers of my invention by a process as set forth in the preceding paragraph, using at least 8 mols of allyl bromide per mol of 1,3,5-trimethylene trisulfone. I prefer to effect recovery of the reaction product by diluting the oily reaction mixture with a water-immiscible solvent for the reaction product, especially a monocyclic aromatic hydrocarbon typified by benzene, allowing the mixture to separate into two layers, namely an organic layer composed of a solution of the reaction product or products and unreacted allyl bromide in the water-immiscible solvent and an aqueous layer of the alkali, almost invariably an alkali metal hydroxide, separately withdrawing or otherwise separating the two layers, and removing the solvent and unreacted allyl bromide from the separated organic layer. Generally the residual product is a mixture of the penta- and hexa- allylated 1,3,5-trimethylene trisulfones. Preferably this residual product is further purified as by washing with dilute hydrochloric acid and finally with cold ethyl alcohol or like non-solvent for the reaction products. The resulting mixture can, if desired, be separated into its two components, namely, the penta- and the hexa- compounds by crystallization from suitable solvents.

In carrying out the process of my invention, the allyl halide and the 1,3,5-trimethylene trisulfone are brought together in the basic aqueous medium. The reaction is continued until the reaction product separates as an alkali-insoluble oily phase. The number of allyl groups introduced depends upon the temperature and duration of the reaction, upon the molar proportion of reactants, and upon the allyl halide employed.

The products of my invention can be polymerized by themselves, i. e., subjected to homopolymerization. For this purpose, I may employ the pure penta or pure hexa compound although, for reason of economy I usually employ a mixture of the two types of compounds. When such a mixture is used, in addition to homopolymerization, copolymerization of the two monomers may also occur to a substantial extent. Instead of polymerizing the products of my invention by themselves, I much prefer to copolymerize them with other copolymerizable unsaturated material which can be monomeric or partially polymerized. Any material which is copolymerizable with the penta- or hexa- compound of my invention can be used. Of particular interest are the linear polyesters (unsaturated alkyds) which are chain compounds formed from an alpha-beta ethylenically unsaturated dicarboxylic acid and a glycol by reacting such an acid and glycol in such proportions that there are present in the reacting mixture about one carboxyl group in such acid to one hydroxyl group in such glycol, to an advanced stage of esterification but short of becoming completely insoluble and infusible, until a partially polymerized product of low acid number is produced which is soluble in the usual organic solvents such as acetone. As the dibasic acid, maleic anhydride is especially suitable and as the glycol, ethylene glycol is particularly useful. For example, 372 parts of ethylene glycol and 588 parts of maleic anhydride can be heated at 180–200° C. in an inert atmosphere until the acid number is reduced to 25. Esters of this type are commonly designated as poly (ethylene maleate) and are particularly valuable as copolymerizable materials with the new compounds of my invention.

Other useful copolymerizable materials include styrene, methyl methacrylate and other common unsaturated polymerizable materials.

The penta- and hexaallyl-1,3,5-trimethylene trisulfones of my invention are completely compatible with the linear polyesters of the type described above, with styrene, with methyl methacrylate and with other common monomers. This complete miscibility or compatibility is especially advantageous in that it enhances the usefulness of these new chemicals.

A polymer containing only linear chains, such as one made by homopolymerizing styrene, is thermoplastic and is generally objectionably soluble in many organic solvents. By cross-linking these linear chains, the properties of the polymer are modified; in general the higher the cross-linking tendency, the less soluble and less thermoplastic the resinous polymer obtained. The potential cross-linking density of a resinous polymer depends upon the average number of polymerizable groups per molecule of monomer. Since the penta- and hexaallyl derivatives of 1,3,5-trimethylene trisulfones have an unusually large number of allyl groups per molecule, they are of particular interest as components of thermosetting resins.

The penta- and hexaallyl compounds of my invention differ in a number of important respects from the mono-, di- and triallyl compounds of the prior art, for example, British Patent 614,538 which describes the preparation of the mono-, di- and triallyl-trimethylene trisulfones by the reaction of trimethylene trisulfone with an allyl halide in basic aqueous medium, the product being soluble in dilute alkali and being precipitated from the basic solution by acidification. In contrast the compounds of my invention are insoluble in aqueous alkali, separating therefrom in a distinct oil phase. They are additionally distinguished from the mono-, di- and tri- compounds in that they are soluble in most organic solvents and are oils or low melting solids. As indicated above, they are miscible and compatible with organic materials typified by the linear polyesters, styrene, methyl methacrylate and similar monomers whereas the mono-, di- and tri- compounds are insoluble in organic material such as styrene and linear polyesters. The prior art chemicals are high melting solids, melting above 300° C.

The following examples illustrate the present invention in more detail.

*Example 1*

Twenty-three grams of 1,3,5-trimethylene trisulfone (prepared from sym. trithiane by known methods, and crystallized from concentrated sulfuric acid) was dissolved in 150 cc. of 6 normal sodium hydroxide. Allyl bromide, 100 grams, was added slowly, with agitation, and an exothermic reaction took place. The reaction mixture was stirred for twenty-four hours without the application of heat and then for one hour at 100° C. The oily yellow reaction mixture was diluted with benzene and separated from the aqueous layer. Volatile products including benzene and unreacted allyl bromide were removed by steaming. The residual salve-like mass was washed with dilute acid and finally with cold ethyl alcohol. Yield, 39 grams; theoretical yield, 47 grams as the hexaallyl compound or 43 grams as the pentaallyl body.

A portion of the product was crystallized from alcohol, giving a white crystalline solid, m. p. 100–102° C. Evaporation of the filtrate left a viscous oil. Analytical data:

The crystalline material is essentially pentaallyltrimethylene trisulfone, while the oil consists largely of penta- and hexaallylated trimethylene trisulfone. The overall ratio of pentaallyl compound to hexaallyl compound is dependent on the reaction conditions. Under those of the example, the products are formed in about equal amounts.

*Example 2*

The oily mixture of about equal parts of penta- and hexaallyltrimethylene trisulfone made in accordance with Example 1 was heated by itself for 120 hours at 140° C. It polymerized to a hard infusible solid which was not affected by hot organic solvents.

*Example 3*

A mixture of one part of the oily mixture of the penta- and hexa-compounds made as in Example 1, with 0.015 parts of benzoyl peroxide and 0.010 parts of di-t-butyl peroxide was heated for 82 hours at a temperature which was gradually increased from 100° C. to 150° C. The resin cured to give a thermoset casting similar to that made in Example 2.

*Example 4*

A mixture of one part of poly(ethylene maleate) and 0.2 part of the mixture of penta- and hexaallyl compounds made by Example 1 was heated for 100 hours at 140° C. The system cured to a hard, infusible, benzene insoluble casting. Under the same conditions, a sample of poly(ethylene maleate) failed to homopolymerize.

*Example 5*

A mixture of five parts of poly(ethylene maleate) and 0.5 part of the mixture of penta- and allyl compounds made as in Example 1 was commingled with 0.07 part of a 50% solution of dibenzal diperoxide in tri-cresyl phosphate. This mixture was heated for 22 hours at 120° C.; it cured to give a thermoset casting insoluble in hot organic solvents typified by benzene.

*Example 6*

A solution of 5 parts of styrene, one part of the mixed penta- and hexa- compounds of Example 1 and 0.12 part of benzoyl peroxide was heated for 140 hours at 110–125° C. The mixture underwent polymerization and gave a casting which was elastic but firm at room temperature. At 140° C. the casting retained its shape and remained elastic. It was swollen by hot benzene but did not dissolve. Under the same conditions styrene without the penta- and hexaallyl trimethylene trisulfone polymerized to give a casting which was brittle at room temperature but melted before 140° C. was reached. This homopolymer was readily soluble in hot benzene.

As indicated above, I am not limited to the polymerization of the mixture of the penta- and hexa- compounds to give a thermoset material. Instead I can use either the pure penta- or the pure hexa- compound. The following two examples illustrate the polymerization of the purified penta- compound.

| Element (per cent) | Calculated for $(C_3H_5)_5C_3HS_3O_6$ | Found (for solid) | Calculated for $(C_3H_5)_6C_3S_3O_6$ | Found (for oil) |
|---|---|---|---|---|
| C | 49.7 | 49.8; 49.9 | 53.1 | 51.9; 52.1 |
| H | 6.0 | 5.7; 5.8 | 6.3 | 6.3; 6.2 |
| S | 22.1 | 21.6; 21.8 | 20.2 | 19.9; 19.8 |

Example 7

Penta-allyl-1,3,5-trimethylene trisulfone (0.5 part) and benzoyl peroxide (approximately 0.015 part) were mixed and heated at 125° C. for twenty-four hours, at which time the material had polymerized to a hard infusible solid which was not affected by hot benzene.

Example 8

Penta-allyl-1,3,5-trimethylene trisulfone (0.5 part) and poly(ethylene maleate), (4 parts), were mixed and treated with benzoyl peroxide (approximately 0.13 part). After heating for 24 hours at 125° a hard infusible polymer which was not affected by hot benzene, had formed.

From the foregoing it will be seen that the present invention makes available to the art valuable new compounds namely the penta- and hexaallyl-1,3,5-trimethylene trisulfones, and valuable polymers and copolymers thereof. It will be also seen that the present invention provides a simple and economical process of making the new and useful compounds of my invention. Numerous other advantages of the present invention will be apparent to those skilled in the art.

What I claim is:

1. As a new composition of matter, a material selected from the group consisting of pentaallyl-1,3,5-trimethylene trisulfone, hexaallyl-1,3,5-trimethylene trisulfone, and mixtures thereof.

2. As a new chemical compound, pentaallyl-1,3,5-trimethylene trisulfone.

3. As a new chemical compound, hexaallyl-1,3,5-trimethylene trisulfone.

4. As a new composition of matter, a polymer of a material selected from the group consisting of pentaallyl-1,3,5-trimethylene trisulfone, hexaallyl-1,3,5-trimethylene trisulfone, and mixtures thereof.

5. As a new composition of matter, a polymerizable mixture of (A) a material selected from the group consisting of pentaallyl-1,3,5-trimethylene trisulfone, hexaallyl-1,3,5-trimethylene trisulfone, and mixtures thereof, and (B) a different unsaturated material copolymerizable therewith, of the group consisting of the linear polyesters, styrene and methyl methacrylate.

6. As a new composition of matter, an infusible, insoluble copolymer of (A) a material selected from the group consisting of pentaallyl-1,3,5-trimethylene trisulfone, hexaallyl-1,3,5-trimethylene trisulfone, and mixtures thereof, and (B) a different unsaturated material copolymerizable therewith, of the group consisting of the linear polyesters, styrene and methyl methacrylate.

7. As a new composition of matter, a polymerizable mixture of (A) a material selected from the group consisting of pentaallyl-1,3,5-trimethylene trisulfone, hexaallyl-1,3,5-trimethylene trisulfone, and mixtures thereof, and (B) poly(ethylene maleate).

8. As a new composition of matter, an infusible, insoluble copolymer of (A) a material selected from the group consisting of pentaallyl-1,3,5-trimethylene trisulfone, hexaallyl-1,3,5-trimethylene trisulfone, and mixtures thereof, and (B) poly(ethylene maleate).

9. As a new composition of matter, a polymerizable mixture of (A) a material selected from the group consisting of pentaallyl-1,3,5-trimethylene trisulfone, hexaallyl-1,3,5-trimethylene trisulfone, and mixtures thereof, and (B) styrene.

10. As a new composition of matter, an infusible, insoluble copolymer of (A) a material selected from the group consisting of pentaallyl-1,3,5-trimethylene trisulfone, hexaallyl-1,3,5-trimethylene trisulfone, and mixtures thereof, and (B) styrene.

ALLEN E. SMITH.

REFERENCES CITED

The following references are of record in the file of this patent:

UNITED STATES PATENTS

| Number | Name | Date |
|---|---|---|
| 2,535,533 | Evans et al. | Dec. 26, 1950 |
| 2,535,534 | Evans et al. | Dec. 26, 1950 |

FOREIGN PATENTS

| Number | Country | Date |
|---|---|---|
| 614,538 | Great Britain | Dec. 16, 1948 |
| 614,539 | Great Britain | Dec. 16, 1948 |

OTHER REFERENCES

Camps, Berichte, 25, 233–257 (1892).